April 18, 1933.  E. HAUGEN  1,904,453
DUMP CAR
Filed Aug. 24, 1931  3 Sheets-Sheet 1
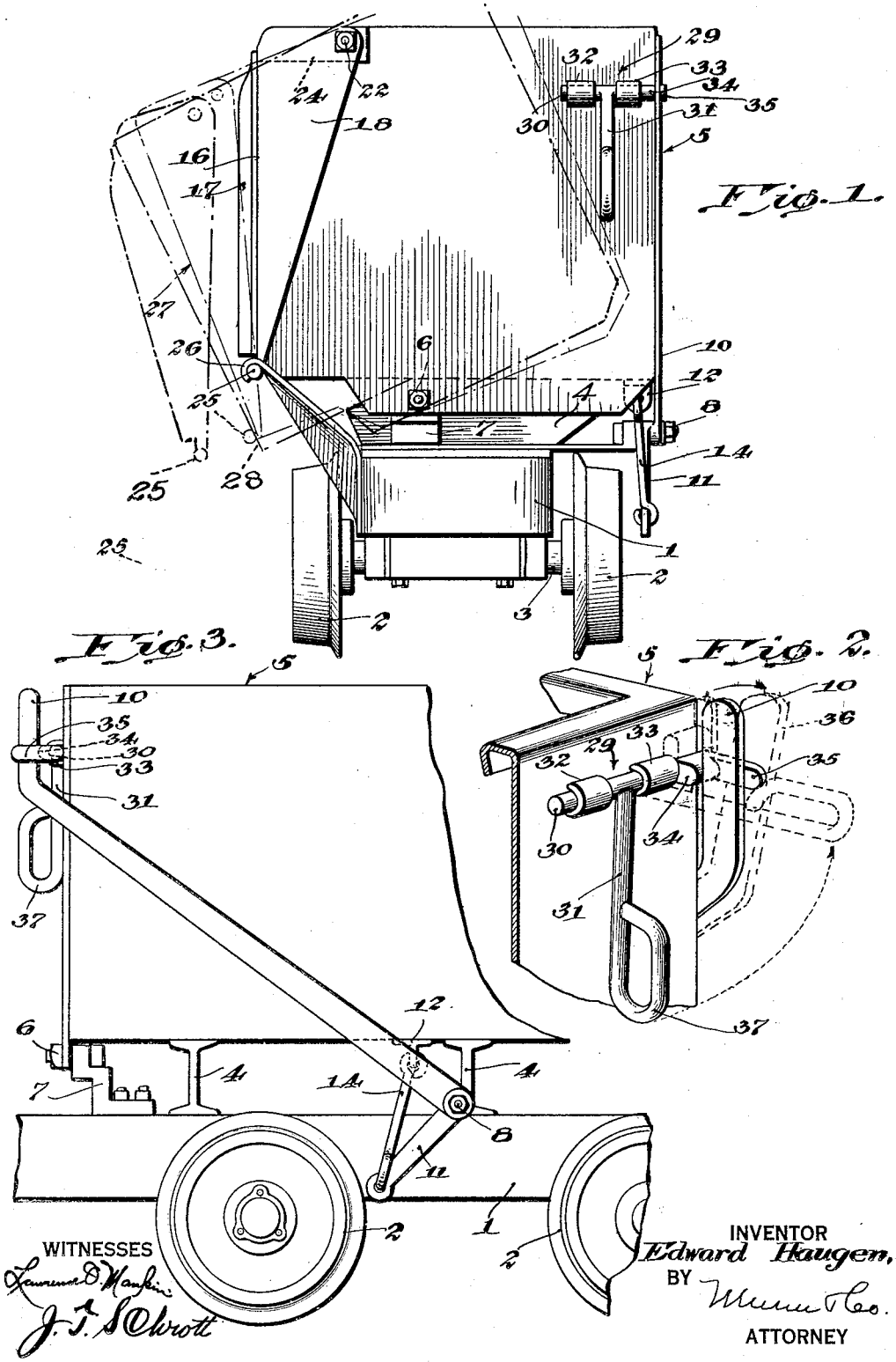
INVENTOR
Edward Haugen,
BY
ATTORNEY April 18, 1933.   E. HAUGEN   1,904,453
DUMP CAR
Filed Aug. 24, 1931   3 Sheets-Sheet 2
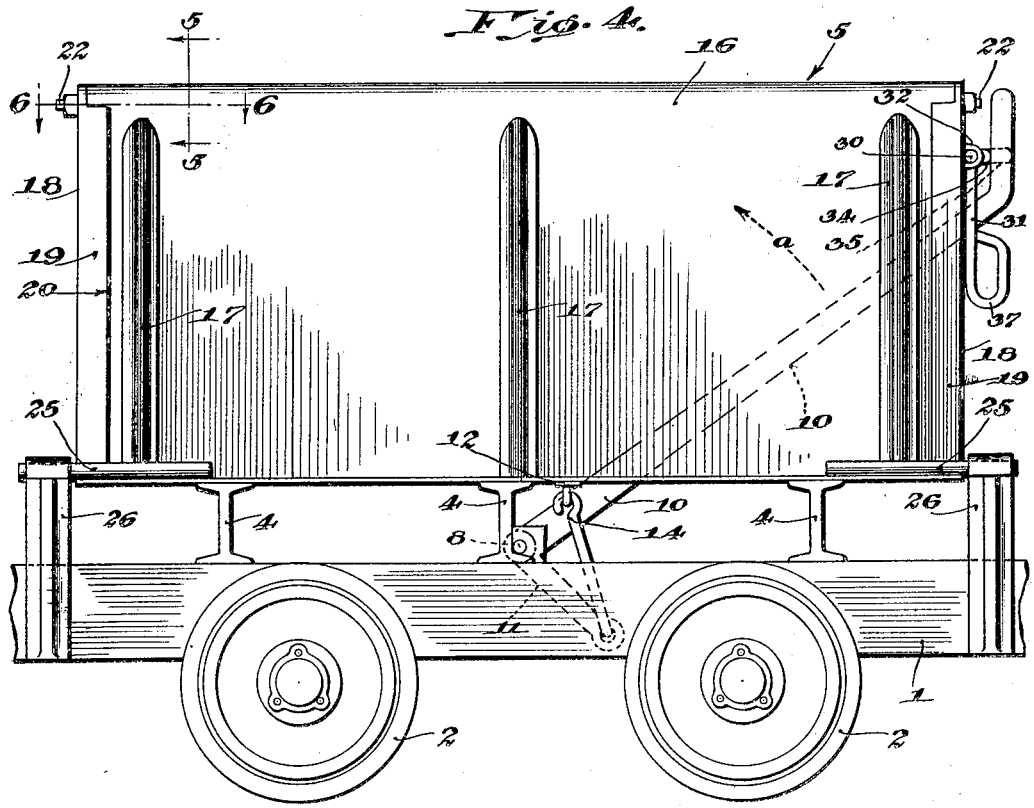
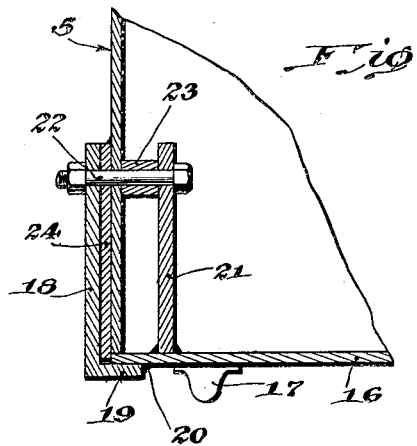
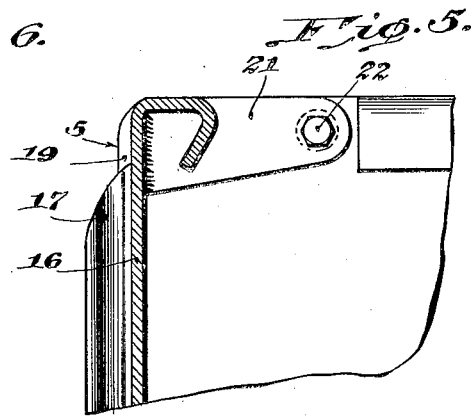
WITNESSES
INVENTOR
Edward Haugen,
BY
ATTORNEY April 18, 1933.    E. HAUGEN    1,904,453
DUMP CAR
Filed Aug. 24, 1931    3 Sheets-Sheet 3
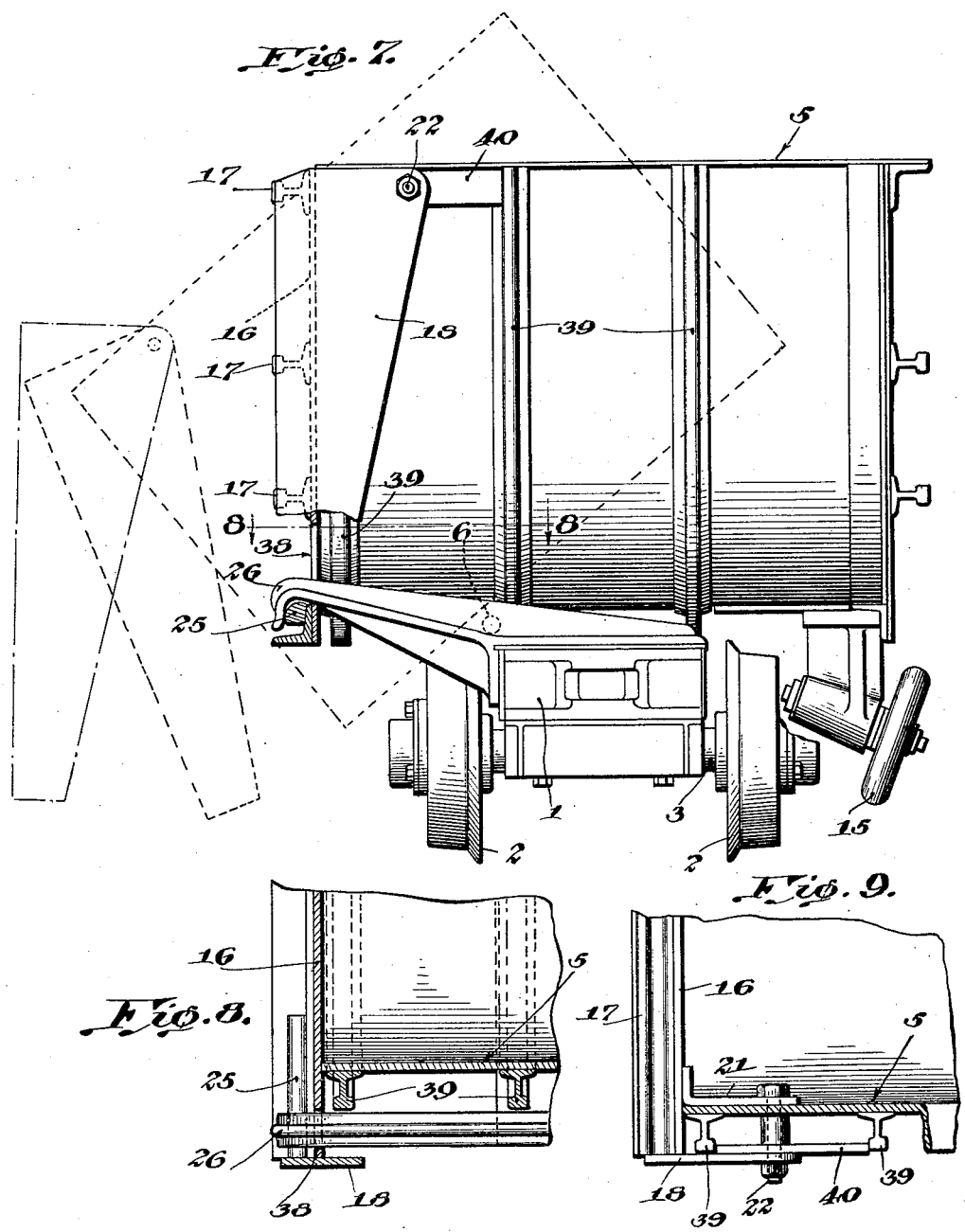
WITNESSES
INVENTOR
Edward Haugen
BY
ATTORNEY Patented Apr. 18, 1933

1,904,453

UNITED STATES PATENT OFFICE

EDWARD HAUGEN, OF WALLACE, IDAHO, ASSIGNOR TO COEUR D'ALENE HARDWARE & FOUNDRY COMPANY, OF WALLACE, IDAHO, A CORPORATION OF IDAHO

DUMP CAR

Application filed August 24, 1931. Serial No. 559,088.

This invention relates to improvements in dump cars, and it consists of the constructions, combinations and arrangements herein described and claimed.

An object of the invention is to provide a dump car of any of the known types, for example a railway dump car, with an automatically operating door, an outstanding feature of the door being that it will lock itself and remain locked during the upright position of the car but of its own accord will assume the unlocked position when the car is tilted for dumping.

A further object of the invention is to provide a dump car in which the door is entirely unfettered for free opening and closing movement with the exception of the interengaging slip connection locking means respectively on the door and truck which comes into play substantially at the immediate beginning of the dumping motion of the car and end of the return motion to the loading position.

A further object of the invention is to provide a dump car which comprises an all-steel, electrically welded frame and body, thereby avoiding the use of rivets and producing an exceptionally strong construction.

Other objects and advantages will appear in the following specification, reference being had to the accompanying drawings in which Figure 1 is an end elevation of one type of side dump car both illustrating the door and lever locking devices.

Figure 2 is a detail perspective view of the lever locking device, illustrating how the inherent resiliency of the lever causes the latter to spring clear when the latch or detent is turned a prescribed distance.

Figure 3 is a fractional side elevation of the dump car in Figure 1, viewing the latter from the right side and showing the relationship of the locking device to the dumping lever.

Figure 4 is a side elevation of the car in Figure 1, showing it as viewed from the left or door side.

Figure 5 is a cross section taken on the line 5—5 of Figure 4.

Figure 6 is a detail horizontal section taken on the line 6—6 of Figure 4.

Figure 7 is an end elevation of another type of dump car in which tilting for the purpose of dumping is accomplished by means other than a lever as in Figure 1, but again showing the improved automatic door lock.

Figure 8 is a cross section taken on the line 8—8 of Figure 7.

Figure 9 is a plan view of the hinge construction at the near end of the door in Figure 7, a part being shown in section.

This invention is a general improvement in railway or other dump cars and especially on the railway dump car of Ellis L. Hale and Harry Glen Coulson described in their Patent 1,468,350 of September 18, 1923. Those parts in the instant construction which one might say are common with the patent are briefly described as follows:—A frame 1 is carried by suitable car wheels 2 and axles 3, these parts constituting a truck. The frame 1 carries a plurality of supports 4 (Fig. 4) upon which the car body, generally denoted 5 is tiltably mounted by means of pivots 6 (Figs. 1 and 7) which may either be combined with pivot blocks 7 (Fig. 1) mounted on the frame or arranged in any other preferred manner.

A pivot 8 provides the support of a dumping lever 10 in the type of car shown in Figures 1 and 4. The lever assemblage includes an arm 11 between which and a block 12 on the nether side of the car 5 a link 14 is connected. Thus far it will be understood that when the dumping lever 10 is swung to the left (arrow a, Fig. 4), the car body 5 will be tilted on its pivotal axis 6 (Fig. 1) so that the contents will be discharged.

Before describing the improvements on the foregoing patent, which description is now in order, it is desired to point out that the cars in Figures 1 to 6 and 7 to 9 are of two different types. Each is a side dump car, but the car in Figures 1 to 6 is known to the trade as the "Page" type car, while the car in Figures 7 to 9 is known to the trade as the "Granby" type car. One is dumped by hand through the instrumentality of the lever 10, and the other by means of a heavy wheel 15 (Fig. 7) which is made to ride over a hump or ramp along the track while being pulled by the locomotive. Those parts which are similar in the two types of cars have been and will be identified by corresponding reference numerals.

Now as to the first improvement on the patent. The door 16 opens and closes automatically. It comprises a large side plate to which the character 16 is shown applied, this plate being reinforced either by upright (Fig. 4) or horizontal (Fig. 7) elements 17. It includes end plates 18 (Figs. 1 and 6) which are made integral with the door plate 16 either by flanging and welding at 19, 20 (Fig. 6) or by a solid, original construction. The end plates 18 have diminutive counterparts 21 situated on the inside of the car body 5 (Figs. 5 and 6) which, together with the end plates 18 constitute a hinge.

Studs 22 (Figs. 1 and 6) comprise the hinge pivots. Suitable sleeves 23 (Fig. 6) take up the space between the members 21 and the adjacent end of the car body 5. The latter is reinforced at 24 (Fig. 6) where the studs 22 go through and where a great amount of wear, due to the movement of the end plates 18 is likely to occur.

This door has lugs 25 (Figs. 1 and 4) made integral with the bottom edge. These lugs extend beyond the ends of the door so as to be accessible to hooks 26. These hooks are rigidly secured to the frame 1 and include downwardly turned portions to receive the lugs 25 therebehind (Fig. 1) when the car body 5 assumes the upright or normal position. The lugs 25 and hooks 26 constitute a slip connection mutually carried by the door and car body, the lugs slipping out at the beginning of a dumping movement and slipping back to the locking position at the end of the movement of the car body toward the normal position.

Instead of the door 16 being provided with positive means for its operation as in the foregoing patent, it automatically opens and closes as well as unlocks and locks by a combination of the force of gravity with the movement of the car body 5 between the normal or upright and dumping positions. In furtherance of this purpose the door is unfettered insofar as any appendages which might interfere with its free movement are concerned, the only exception being the slip connection locking means, consisting of the lug 25 and hook 26 (Fig. 1), which does the locking substantially at the end of a movement of the car body to the loading position, or causes unlocking at substantially the beginning of the dumping movement of the car body. Figure 1 shows three positions of the car body 5. When the car body is in the normal or full-line position the lugs 25 are caught behind the hooks 26 and are incapable of disengaging, hence prevent swinging of the door 16 on its hinge pivots 22, as long as the car body 5 is not tilted.

When the latter is tilted on its pivotal axis 6 to the approximate position 27 (Fig. 1) the lugs 25 will have departed from the hooks 26 and automatically released the door 16 so that the latter is free for swinging when the load presses heavily enough against it. When the car body 5 is tilted to the position 28 (Fig. 1) the door 16 will have opened more decidedly. Tracing these positions on the reverse order, it is easy to see that as the car body 5 nears the normal or upright position the lugs 25 will again be caught behind the hooks 26 so that the door 16 will become automatically locked.

The second improvement on the foregoing patent concerns the dumping lever 10. This is now provided with a locking device 29 (Figs. 1 and 2) which engages and holds the dumping lever 10 in one of its positions so as to prevent movement of said lever on its pivot 8 and a consequently inadvertent tilting of the car 5.

This locking device comprises what might be described as a bolt 30 (Figs. 1 and 2) which can be turned by a handle 31 but not slid in its supports 32, 33. The handle 31 is situated between the two supports and is held substantially against the support 33 by a cam 34 on the bolt 30 immediately outside of the support 33. In other words, the handle 31 and cam 34 are close to the support 33 and so prevent endwise movement of the bolt 30 without impeding the turning of the bolt in order to release the lever 10.

This lever has a certain amount of inherent resiliency. When the handle 31 is down, (Fig. 2) the cam 34 presses against the near edge of the lever 10 while an extension 35 from the cam keeps the lever close to the car body out of the way of any obstruction which might be engaged in tunnels or along the tracks. The extension 35 resists the outward springing tendency of the lever 10, but when the handle 31 is lifted to the dotted line position (Fig. 2), by which act the cam 34 and extension 35 are turned to the upright position, the dumping lever 10 springs clear to the dotted line position 36 from which it is free to be swung to the left (arrow a, Fig. 4) preparatory to tilting the car 5 on its pivotal axis.

It is to be observed that the handle 31 has a rather large bend 37 (Fig. 2). This provides an adequate handhold enabling the operator to push the cam 34 into the locking position of the device 29, provided that the lever 10 has first been brought to the full-line position (Fig. 2) where it can be engaged by the cam 34 and extension 35. The purpose of the cam 34 is to prevent any loose pivotal play of the lever 10, this being accomplished by its bearing against the near edge of the lever as already brought out.

After the lever 10 has been disengaged from the locking device 29 the handle 31 will fall due to its weighted end.

A third improvement on the foregoing patent resides in making the car body of an all-steel, electrically welded construction. No rivets are employed at all as in the patent. A construction such as this insures both cheapness and lightness. A seam can be welded far more quickly than it can be riveted. When welding is resorted to it is possible to use somewhat lighter plates.

Now referring to Figure 7 it will be noted that the hook 26 (there being another hook at the other end of the car) is engaged by the lug 25 on the door 16 when the latter is closed. It so happens that the ends of the car body 5 are rounded instead of square as in Figure 1. This disposes the bottom corners of the door 16 in a place clear of the rounded ends. These corners have adjacent openings 38 (Figs. 7 and 8) through which the hooks 26 project when the door is closed. The openings are vertically elongated, and are of such proportions that the door can readily swing clear of the hooks when the car body 5 is tilted for dumping.

Reinforcing elements 39, for example in the form of rails, extend lengthwise around the car body 5 (Fig. 7). It is between the outermost pair of these rails adjacent to the open side of the car that bridge pieces 40 (Figs. 7 and 9) are welded. These bridge pieces and the ends of the car support the hinge pivots 22 of the door 16. A member 21 (Fig. 9), somewhat similar to the member 21 in Fig. 5 completes the door hinge at one end, the completement to the member 21 being the outer end plate 18.

I claim:—

1. A dump car comprising a truck, a body tiltably mounted on the truck, an unfettered door movably carried by the body, said door tending to open immediately after an initial tilt of the body toward a dumping position, a lug on the door, and a hook on the truck engaged by the lug to lock the door from which hook the lug is displaced by the door after said initial tilt of the body.

2. A dump car comprising a truck, a downturned hook attached to the truck, a body tiltably mounted on the truck, an unfettered door movably carried at its upper end by the body, said door tending to swing open immediately upon tilting of the body toward a dumping position, and a lug carried by the door being pocketed in said hook from beneath while the body assumes a loading position, but shifting downwardly out of and away from the hook after the initial tilt of the body.

3. A dump car body having welded seams and an open vertical side, a door having welded seams, means to hinge the door at the top of the body tending to enable a free opening and closing of the door by gravity when the body is tilted toward dumping and loading positions, and locking means releasing and locking by gravity substantially at the immediate beginning and end of said dumping and loading positions.

4. A dump car comprising a tiltable body having an upright side opening, a door for said opening, means to hinge the door substantially at its top near the upper end of the opening, said door being otherwise inherently free for unrestricted outward swinging after a fractional tilt of the body toward a dumping position, and locking means for the door effective to prevent swinging of said door only during said fractional tilt, said locking means including a projection on the door, and a fixed detent with which said projection is engageable.

EDWARD HAUGEN.